(12) United States Patent
Jeong et al.

(10) Patent No.: US 10,427,939 B2
(45) Date of Patent: Oct. 1, 2019

(54) METHOD FOR PRODUCING SPHERICAL ALUMINUM NITRIDE POWER

(71) Applicant: LG Chem, Ltd., Seoul (KR)

(72) Inventors: Han Nah Jeong, Daejeon (KR); Donghwan Kim, Daejeon (KR); Shin Hee Jun, Daejeon (KR); Myounghwan Oh, Daejeon (KR); Haejong Jung, Daejeon (KR); Sang Hun Cheong, Daejeon (KR)

(73) Assignee: LG Chem, Ltd. (KR)

(*) Notice: Subject to any disclaimer, the term of this patent is extended or adjusted under 35 U.S.C. 154(b) by 0 days.

(21) Appl. No.: 16/295,614

(22) Filed: Mar. 7, 2019

(65) Prior Publication Data
US 2019/0202697 A1    Jul. 4, 2019

Related U.S. Application Data

(63) Continuation of application No. PCT/KR2018/006485, filed on Jun. 7, 2018.

(30) Foreign Application Priority Data

Aug. 11, 2017    (KR) .................. 10-2017-0102525

(51) Int. Cl.
*C01B 21/072*    (2006.01)
(52) U.S. Cl.
CPC ...... *C01B 21/0726* (2013.01); *C01P 2002/72* (2013.01); *C01P 2004/03* (2013.01);
(Continued)
(58) Field of Classification Search
None
See application file for complete search history.

(56) References Cited

U.S. PATENT DOCUMENTS 9,199,848 B2    12/2015    Watanabe et al.
2012/0258310 A1*    10/2012    Watanabe ............. C01B 21/072
                                                                    428/402
(Continued)

FOREIGN PATENT DOCUMENTS

CN    101386539 A    3/2009
JP    H0323206 A    1/1991
(Continued)

OTHER PUBLICATIONS

Nicholson et al.; Effect of Additives on the Pressureless Sintering of Aluminum nitride between 1500 degrees and 1800 degrees Celsius; J. Am. Ceram. Soc., 72 {8} 1488-91; 1989.*
(Continued)

*Primary Examiner* — Guinever S Gregorio
(74) *Attorney, Agent, or Firm* — Lerner, David, Littenberg, Krumholz & Menlik, LLP

(57) ABSTRACT

The present invention provides method for producing a spherical aluminum nitride powder. In an embodiment, the method comprises mixing an Al precursor and a flux in a solvent to produce a mixed solution, spray-drying the mixed solution to form a spray-dried powder, mixing the spray-dried powder and a carbon-based material to form a mixture, heat treating the mixture in a nitrogen atmosphere to form a heat-treated compound, and decarbonizing the heat-treated compound in an air atmosphere, wherein the flux is at least one selected from the group consisting of $Cu_2O$, $TiO_2$, $Bi_2O_3$, and CuO, or a mixture of at least one selected from the group consisting of $Cu_2O$, $TiO_2$, $Bi_2O_3$, and CuO and at least one selected from the group consisting of $CaF_2$ and $Y_2O_3$.

10 Claims, 2 Drawing Sheets

(52) U.S. Cl.
CPC ...... *C01P 2004/32* (2013.01); *C01P 2004/61* (2013.01); *C01P 2006/12* (2013.01); *C01P 2006/32* (2013.01); *C01P 2006/80* (2013.01)

(56) References Cited

U.S. PATENT DOCUMENTS

| | | | |
|---|---|---|---|
| 2013/0164534 A1 | 6/2013 | Muneoka et al. | |
| 2015/0086467 A1* | 3/2015 | Fukunaga | C01B 21/0722 423/412 |

FOREIGN PATENT DOCUMENTS

| | | |
|---|---|---|
| JP | H05221618 A | 8/1993 |
| JP | H11269302 A | 10/1999 |
| JP | 3290686 B2 | 6/2002 |
| JP | 2002179413 A | 6/2002 |
| JP | 2004292178 A | 10/2004 |
| JP | 2005104818 A | 4/2005 |
| JP | 2005162555 A | 6/2005 |
| JP | 4203593 B2 | 1/2009 |
| JP | 2012121742 A | 6/2012 |
| JP | 2013087042 A | 5/2013 |
| KR | 20120120268 A | 11/2012 |
| KR | 20130102042 A | 9/2013 |
| KR | 101545776 B1 | 8/2015 |

OTHER PUBLICATIONS

Search report from International Application No. PCT/KR2018/006485, dated Oct. 10, 2018.

Han-Min, Bian, et al., "Preparation of nanostructured alumina-titania composite powders by spray drying, heat treatment, and plasma treatment." Powder Technology, vol. 219 (2012), Available online Dec. 29, 2011, pp. 257-263.

Wang, Qi, et al., "Hydrolysis Control of AIN Powders for the Aqueous Processing of Spherial AIN Granules." Journal of the American Ceramic Society, vol. 96, No. 5, Received Oct. 9, 2012; approved Feb. 17, 2013, pp. 1383-1389.

Wang, Qi, et al., "Preparation of dense spherical AIN filters by aqueous granulation and post-sintering process." Ceramics International, vol. 43, Received Oct. 3, 2016; Accepted Oct. 25, 2016, pp. 2027-2032.

\* cited by examiner

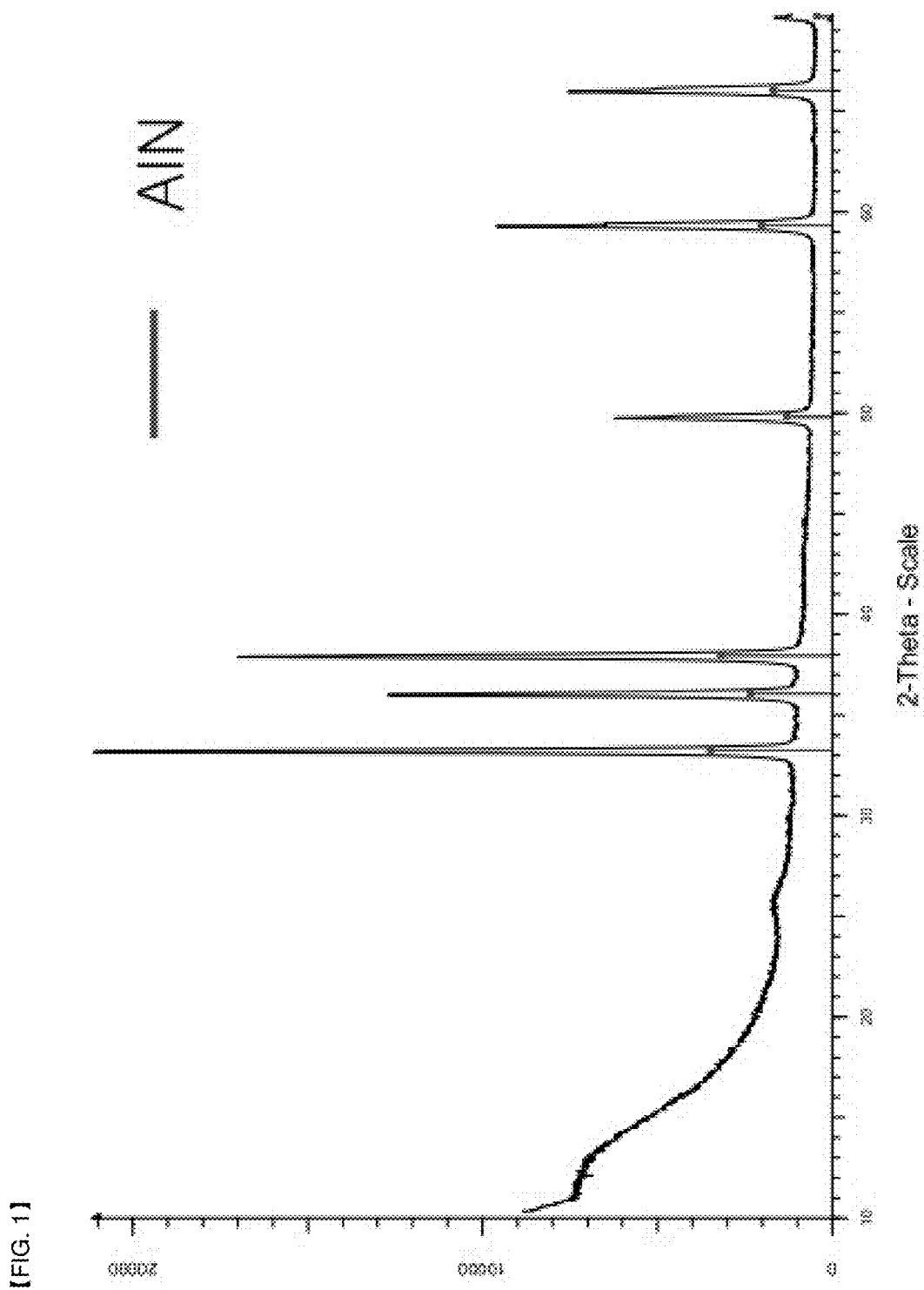
[FIG. 1]

METHOD FOR PRODUCING SPHERICAL ALUMINUM NITRIDE POWER

CROSS-REFERENCE TO RELATED APPLICATION

The present application is a continuation of International Application No. PCT/KR2018/006485, filed Jun. 7, 2018, which claims priority to Korean Patent Application No. 10-2017-0102525, filed Aug. 11, 2017, the disclosures of which are incorporated herein by reference.

FIELD OF THE INVENTION

The present invention relates to a method for producing a spherical aluminum nitride powder.

BACKGROUND OF THE INVENTION

Aluminum nitride has high heat conductivity and an excellent electrical insulating property, and has been used as a high heat conductive substrate, a heat radiating component, an insulating/heat radiating filler, and the like. Recently, electronic semiconductor components such as integrated circuits (ICs) and computer processing units (CPUs) mounted on high-performance electronic devices, represented by a notebook computer, an information terminal, and the like, are being downsized and highly integrated, such that downsizing of heat radiating members has become essential. Examples of the heat radiating members include a heat radiating sheet and a film-like spacer in which a high heat conductive filler is filled in a matrix such as resin and rubber, a heat radiating grease in which a high heat conductive filler is mixed in silicone oil to have fluidity, and a heat radiating adhesive in which a high heat conductive filler is mixed in an epoxy resin.

Here, as the high heat conductive filler, aluminum nitride, boron nitride, alumina, magnesium oxide, silica, graphite, various metal powders, and the like are used.

In order to improve the heat conductivity of the heat radiating materials, however, it is important that a filler having a high heat conducting property is densely filled. For this reason, an aluminum nitride powder is required to have spherical aluminum nitride particles of a size of several microns to several tens of microns.

Generally, as methods for producing the aluminum nitride powder, a reductive nitridation method of firing alumina and carbon in a nitrogen atmosphere, a direct nitridation method of reacting metal aluminum directly with nitrogen, and a gas phase method of reacting alkylaluminum with ammonia followed by heating have been known.

However, it is difficult to form aluminum nitride powders by the reductive nitridation method and by the gas phase method to have spherical shapes, and their particle sizes are about a submicron size.

Meanwhile, the direct nitridation method makes it possible to relatively easily control the particle size and thus to obtain the aluminum nitride particles of several microns to several tens of microns. However, a pulverization step is essential in this method. Therefore, the particles of the obtained aluminum nitride powder have an angular or amorphous shape, which causes a decrease in fluidity, and it is difficult to very densely fill the aluminum nitride powder as a filler in the resin.

In view of the above, various studies have been made in order to obtain an aluminum nitride powder having a spherical shape and a desired average particle size.

For example, Patent Document 1 (Japanese Unexamined Patent Application Publication No. H3-23206) discloses a method for obtaining an aluminum nitride powder of an average particle size of not less than 3 μm and having a rounded shape by firing a mixture of an alumina powder and a carbon powder in an inert atmosphere to form an aluminum oxide, allowing particles thereof to grow and then firing (nitriding) the particles thereof in a non-oxidizing atmosphere containing nitrogen. However, there is a problem that since the aluminum nitride powder obtained by this method has an elliptical shape, has low sphericity, and involves conversion of the firing atmosphere, it is difficult to control the growth of alumina particles, that is, to control the particle size distribution of the obtained aluminum nitride powder.

In addition, Patent Document 2 (Japanese Unexamined Patent Application Publication No. H2005-162555) discloses a method for producing a spherical aluminum nitride powder having an average particle size of 50 μm or less, sphericity of 0.8 or more, and excellent water resistance, by reductively nitriding a spherical alumina by nitrogen gas or ammonia gas in the presence of carbon and then subjecting it to surface oxidation. However, in the above production method, since the spherical shape of alumina as a raw material is made into the shape of the aluminum nitride powder of the final product as it is, it is necessary to use alumina having a particle size equivalent to or larger than a desired particle size. In the reductive nitridation of alumina having such a large particle size, a long reaction time is required to improve its conversion.

In addition, Patent Document 3 (Japanese Unexamined Patent Application Publication No. H5-221618) discloses a method for producing an aluminum nitride powder by firing a mixed powder of an aluminum oxide powder, a carbon powder, and a rare earth compound as a starting material in a non-oxidizing atmosphere containing nitrogen. This method utilizes the function of accelerating the reaction of an alkaline earth metal compound or a rare earth compound to produce aluminum nitride at a low temperature of 1500° C. or lower. However, the aluminum nitride powder obtained by this method specifically has a particle size of only about 1 μm, and a relatively large particle size of about several microns is not obtained.

Further, Patent Document 4 (Japanese Unexamined Patent Application Publication No. H2002-179413) discloses a method of firing an aluminum nitride powder of amorphous particles in a flux including compounds of alkaline earth metals, rare earth metals, and the like so as to assume a spherical shape, and then dissolving the flux to isolate the aluminum nitride powder. This method makes it possible to obtain the aluminum nitride powder having excellent fluidity and filling properties. However, there is a problem that impurities such as oxygen and the like easily infiltrate into the aluminum nitride powder during the heat treatment process.

Furthermore, Patent Document 5 (Japanese Unexamined Patent Application Publication No. H11-269302) discloses a method for producing a spherical aluminum nitride powder by adding a forming assistant to an AlN (aluminum nitride) powder produced by a predetermined method, wet-pulverizing the mixture thereof, granulating the pulverized mixture by using a spray drier, mixing a BN powder into the obtained granulated product (granules), and then firing and sintering the mixture at a high temperature in a nitrogen atmosphere. According to this method, however, the firing is necessary for sintering the obtained particles in addition to firing for nitridation of aluminum, and the sintering temperature is very high. Thus, the firing must be carried out twice at high temperatures and its granulation is not easy. Further, since AlN is vulnerable to moisture, it cannot be subjected to spray drying by using water as a solvent, and thus another surface modification is required for the water-based spray drying.

To solve these problems, there has been suggested a method of conducting spray-drying using precursors such as $Al_2O_3$, $Al(OH)_3$, and boehmite which are stable in a water system, mixing the dried product with carbon, followed by heat treatment at 1200° C. to 1800° C. in a nitrogen atmosphere. However, when an $\alpha$-$Al_2O_3$ phase is used as a precursor, the AlN conversion is 100%, but when $Al(OH)_3$ or boehmite and other $Al_2O_3$ phases are used as precursors, the AlN conversion is low, and thus there is a problem that the use of the precursor is limited.

Therefore, there is a great need for a production method capable of efficiently producing a spherical aluminum nitride powder having a spherical shape most suited for use as a filler, and having an average particle size of several tens of microns.

DETAILED DESCRIPTION OF THE INVENTION

Technical Problem

The present invention has been made to solve the above-mentioned problems occurring in the prior arts and the technical problems which have been encountered in the past.

Specifically, it is an object of the present invention to provide a method capable of having high conversion into AlN from a stable water-based starting material by using a water-based spray method even while using a common spray-drying apparatus, enabling synthesis of AlN at a relatively low temperature, and thus being capable of efficiently producing a spherical aluminum nitride powder having an average particle size of several tens of microns while having a spherical shape most suited for use as a filler.

Technical Solution

In order to achieve the above objects, the present invention provides a method for producing a spherical aluminum nitride powder including the steps of:

(i) mixing an aluminum (Al) precursor and a flux in a solvent to produce a mixed solution;

(ii) spray-drying the mixed solution produced in step (i) to form a spray-dried powder comprising the Al precursor and the flux;

(iii) mixing the spray-dried powder and a carbon-based material to form a mixture;

(iv) heat treating the mixture of step (iii) in a nitrogen atmosphere to form a heat-treated compound; and (v) decarbonizing the heat-treated compound of step (iv) in an air atmosphere to produce a spherical aluminum nitride powder, wherein the flux is at least one selected from the group consisting of $Cu_2O$, $TiO_2$, $Bi_2O_3$, and CuO, or a mixture of at least one selected from the group consisting of $Cu_2O$, $TiO_2$, $Bi_2O_3$, and CuO and at least one selected from the group consisting of $CaF_2$ and $Y_2O_3$.

That is, according to the present invention, when an Al precursor is mixed with a flux, spray-dried, mixed with a carbon-based material, and heat treated as described above, not only is it possible to synthesize AlN at a relatively low temperature due to the low eutectic point of the Al precursor and flux, but also to have conversion of 99.5% or more which is very high conversion, and spherical aluminum nitride powder having an average particle size of several tens of microns can be obtained efficiently while having a spherical shape most suited for use as a filler.

In this case, the Al precursor may be at least one selected from the group consisting of $Al(OH)_3$, boehmite (AlO(OH)), and $Al_2O_3$. Such precursors are highly stable in water, and as will be described hereinafter, pretreatment is unnecessary during spray drying and thus the number of process steps can be reduced, which is preferable in terms of process efficiency.

The $Al_2O_3$ includes those having a crystal structure of $\alpha$, $\gamma$, $\theta$, $\delta$, $\eta$, $\kappa$, or $\chi$, but is not limited thereto.

The Al precursor may have an average particle size (D50) of 5 microns or less, and specifically 0.1 microns to 2 microns for reductive nitridation reaction. If it exceeds the above range, it is difficult for the reductive nitridation reaction to proceeds to the inside of the particle, and alumina may remain in the inside. In addition, since the ratio of mass transfer through the liquid phase is reduced, the sphericity of the obtained aluminum nitride particle is lowered. Further, if the average particle size is too small, the reductive nitridation reaction tends to be completed at a low temperature in a short period of time, particle growth and mass transfer are difficult, and it may be difficult to obtain aluminum nitride powder having a large particle size.

Since the flux is preferably capable of forming a eutectic liquid phase at a low eutectic point (1200° C. to 1800° C.) with the Al precursor, the flux as described above can be used. However, when $CaF_2$ or $Y_2O_3$ is used alone, the synthesis conversion decreases. Therefore, as described above, at least one flux selected from the group consisting of $Cu_2O$, $TiO_2$, $Bi_2O_3$, and CuO is used, or a mixture of the above materials and at least one selected from the group consisting of $CaF_2$ and $Y_2O_3$ may be used. More specifically, one of $Cu_2O$ and other materials may be used together.

At this time, the flux is granular and the particle size is not limited, but the average particle size may be 0.01 to 50 microns. The BET specific surface area is also not particularly limited, but it may be from 0.01 to 500 $m^2/g$, and more specifically from 0.1 to 100 $m^2/g$.

Such Al precursor and flux can be mixed in a solvent. In this case, the solvent may be a polar solvent, and particularly water.

If the solvent is a non-polar solvent such as toluene, it can be used only in special spray drying equipment such as explosion-proof equipment, which is not preferable in terms of production and cost effectiveness.

Meanwhile, since the present invention uses water as a solvent, it can be easily used even with general spray drying equipment and thus is very efficient.

Mixing in the solvent is not limited as long as it is a method capable of uniformly mixing the respective raw materials. It can use equipment that is generally used when mixing solid materials, and for example, it can be carried out by a blender, a mixer, or a ball mill.

In this case, when the weight of the Al precursor is taken as 100%, the mixture of the Al precursor and the flux may contain 0.1 to 10% by weight of the flux based on the weight of the Al precursor.

When the content of the flux is so low so as to be below the above range, a sufficient amount of the eutectic liquid phase is not formed during the heat treatment, the conversion into the resultant aluminum nitride decreases, and there is a problem that powders having a desired particle size cannot be obtained. Conversely, when the content of the flux is too high, the flux may remain as an impurity, which may cause a decrease in heat conductivity.

On the other hand, in the mixed solution of the Al precursor and the flux, a binder, a dispersing agent, or a binder and a dispersing agent may be further included as required as long as they do not impair the effects of the present invention, but it is not essential.

The binder may be used to facilitate the maintenance of the shape of the particles during spray drying, and can be contained in an amount of 0.1 to 5% by weight, based on the total weight of the mixed solution. Examples of the binder to be used are polyethylene glycol, polyvinyl pyrrolidone, polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, an ethylene-propylene-diene terpolymer (EPDM), sulfonated EPDM, styrene butadiene rubber, fluorine rubber, various copolymers, high molecular weight polyvinyl alcohols, and the like.

The dispersant may be used to facilitate uniform mixing of the Al precursor and the flux in a solvent, and it may be contained in an amount of 0.1 to 5% by weight, based on the total weight of the mixed solution. The dispersant may be, for example, a cationic surfactant, an anionic surfactant, a nonionic surfactant, a polymer substance, or the like.

Such a mixed solution may be subjected to various methods for forming into a spherical dry powder, and can be carried out by a spray drying method from the viewpoint of ease of adjustment of the dry powder particle size, and economic efficiency. The particle size or specific surface area of the dry powder may be controlled by adjusting the solid content concentration of the mixed solution, or can be controlled by adjusting the conditions of spray drying.

As the spray drying method, one using a nozzle, a disk, or the like can be used. The conditions of the spray drying can be appropriately selected depending on the size and type of the dryer used, the concentration and viscosity of the mixed solution, etc.

The dry powder thus formed is mixed with a carbon-based material as a reducing agent in order to be reduced in a subsequent heat treatment. In this case, the carbon-based material may be carbon black, graphite powder, and the like, and specifically, it may be carbon black. Examples of the carbon black are furnace black, channel black, ketjen black, acetylene black, and the like.

The BET specific surface area of the carbon-based material may be 0.01 to 500 $m^2/g$.

Such a carbon-based material may be contained in an amount of 30 to 70% by weight based on the weight of the Al precursor, and more specifically, it can be contained in an amount of 40 to 60% by weight.

When the carbon-based material is contained in an excessively small amount outside the above range, sufficient reduction cannot occur and thus a desired degree of aluminum nitride cannot be obtained, that is, the conversion is lowered. When the carbon-based material is excessively contained, the production cost is increased which is not efficient.

Mixing with the carbon-based material can, in addition to the role as a reducing agent, allow the dry powders to separate from each other by mixing with the dry powder, thereby preventing the powders from aggregating even after the heat treatment.

Mixing of the carbon-based material and the dry powder may also be carried out by dry-mixing the two under a condition that the spherical dry powder is maintained in a stirrer, a blender, a mixer, a ball mill, or the like.

Meanwhile, the mixture of the dry powder and the carbon-based material is reductively nitrided by heat treatment in a nitrogen atmosphere.

In this case, the nitrogen atmosphere in the reaction vessel can be formed by continuously or intermittently supplying nitrogen gas in an amount sufficient to carry out the nitridation reaction of the dry powder used as the raw material.

In addition, the heat treatment may be carried out at a lower temperature than the firing temperature of the original aluminum nitride, for example, at a temperature of 1200° C. to 1900° C., and specifically 1300° C. to 1900° C., for 1 to 10 hours. When the firing temperature is lower than the above-mentioned temperature range, the nitridation reaction does not sufficiently proceed, and the desired aluminum nitride powder may not be obtained.

If the heat treatment temperature is so high so as to exceed the above range, the nitridation reaction proceeds sufficiently, but oxynitride (AlON) having low heat conductivity is easily produced and aggregation of the particles tends to occur easily, and thus it may be difficult to obtain aluminum nitride powder having a desired particle size. Further, when the heat treatment temperature is too low, the conversion into aluminum nitride is low and thus the heat conductivity of the obtained powder itself may be lowered.

In addition, if the heat treatment time is less than 1 hour, the nitridation reaction may not be completed, and if the heat treatment time is longer than 10 hours, the aluminum nitride powder to be formed may aggregate, which is not preferable.

In the present invention, a decarbonization treatment may be carried out in order to remove an excess of carbon-based material present in the aluminum nitride powder obtained after the heat treatment.

This decarbonization treatment is for oxidizing and removing carbon, which is carried out using an oxidizing gas. Specifically, it can be carried out in an air atmosphere. In this case, the decarbonization treatment can be carried out at 600° C. to 800° C. for 1 to 3 hours.

If the decarbonization treatment temperature is too high or if it is carried out for a long period of time, the surface of the aluminum nitride powder is oxidized to an excess degree and the heat conductivity of the aluminum nitride powder decrease, which is not appropriate. Further, if the decarbonization treatment temperature is too low, or if it is carried out for a short period of time, the excess of carbon-based material is not completely removed and it remains as an impurity, which is not preferable.

When produced by such a method, the conversion from an Al precursor to an aluminum nitride powder may be 90% or more, specifically 99% or more, and more specifically 99.5% or more.

The aluminum nitride powder produced may have an average particle size of 5 to 200 microns, specifically 10 to 100 microns, and more specifically 10 to 70 microns.

If the average particle size is outside the above range, it is not suited for use as a filler. Thus, it is preferable to satisfy the above range. Within the above range, the size can be appropriately adjusted and used, as necessary.

In addition, the sphericity of the aluminum nitride powder produced according to the present invention is as high as 0.98 or more, and the heat conductivity when mixing with a resin can have high heat conductivity of 2.7 W/mK.

Advantageous Effects

As described above, in the production method according to the present invention, a stable water-based Al precursor is mixed with a flux and spray-dried in a water system to produce a dried powder, and the dried powder is mixed with a carbon-based material and heat treated. Thereby, when spray drying is used to granulate into a spherical shape, water is used as a solvent and thus it is efficient and exhibits a high AlN conversion of 99.5% or more. Therefore, it is possible to efficiently produce an aluminum nitride powder of a spherical shape having a size of several tens of microns while having a spherical shape most suited for use as a filler.

BRIEF DESCRIPTION OF THE DRAWINGS

FIG. 1 is an XRD graph of aluminum nitride powder (AlN powder) produced according to Example 1.

EXAMPLES

The present invention will now be described with reference to examples, but these examples are provided for better understanding of the invention and the scope of the present invention is not limited thereto.

In the present invention, the specific surface area was measured according to the BET single point method, and the average particle size was measured by a process in which the sample was dispersed in ethanol to measure the average particle size (D50) by using a laser diffraction particle size distribution meter (Horiba LA-960).

AlN conversion was calculated by the following Formula 1.

the intensity of the peak of AlN (100)/{the intensity of the peak of AlN (100)+the intensity of the peak of $Al_2O_3$ (113)}   [Formula 1]

The intensity of the peak is measured in an XRD graph.

The sphericity according to the present invention was calculated as the ratio of the longest diameter to the shortest diameter of any one particle in a SEM photograph.

The heat conductivity was measured after by Laser Flash Apparatus (LFA) mixing silicone rubber with AlN in each case, molding the mixture to 12.7 mm diameter and 2 mm in thickness and then performing heat treatment at 150° C. for 1 hour.

Example 1

10 g of $Al(OH)_3$ (average particle size: 1 μm) and 0.3 g of $Cu_2O$ (average particle size: 1 μm) were mixed with water as a solvent using zirconia balls for 24 hours.

Thereafter, the balls were separated and the mixture was spray-dried under the conditions of 230° C. at the inlet and 60° C. at the outlet to obtain a dry powder.

The obtained dry powder and 4 g of carbon black (specific surface area: 70 m²/g) were mixed in a mortar, and the mixture was heat treated at 1600° C. in a $N_2$ atmosphere for 3 hours.

Then, the heat treated aluminum nitride compound was subjected to a decarbonization at 700° C. for 2 hours in an air atmosphere to obtain a spherical aluminum nitride powder.

Figure 2A:
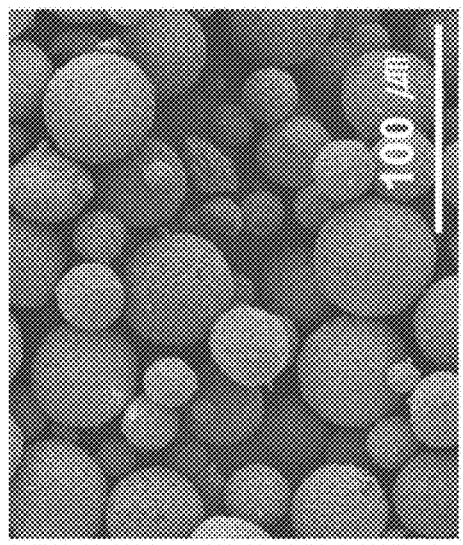
FIG. 2A is an SEM photograph at a scale of 10 μm of the aluminum nitride powder produced according to Example 1.
Figure 2B:
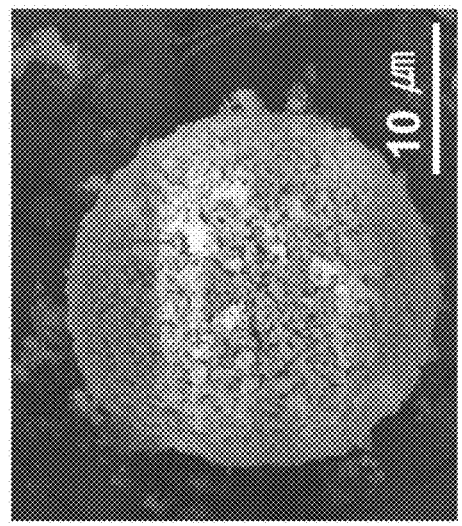
FIG. 2B is an SEM photograph at a scale of 100 μm of the aluminum nitride powder produced according to Example 1.

The XRD graph of the aluminum nitride powder thus obtained is shown in FIG. 1, and the SEM photographs are shown in FIGS. 2A-B.

Referring to FIGS. 1 and 2A-B, it can be confirmed that not only was high purity AlN obtained, but also its shape was spherical and the average particle size was about 20 μm.

Example 2

A spherical aluminum nitride powder was obtained in the same manner as in Example 1, except that 0.2 g of $TiO_2$ (average particle size: 1 μm) was further added and mixed with 10 g of $Al(OH)_3$ (average particle size: 1 μm) and 0.3 g of $Cu_2O$ (average particle size: 1 μm) in Example 1.

Example 3

A spherical aluminum nitride powder was obtained in the same manner as in Example 1, except that 0.3 g of $TiO_2$ (average particle size: 1 μm) and 0.2 g of $Bi_2O_3$ (average particle size: 1 μm) were used instead of 0.3 g of $Cu_2O$ (average particle size: 1 μm) in Example 1.

Example 4

A spherical aluminum nitride powder was obtained in the same manner as in Example 1, except that 10 g of boehmite (average particle size: 1 μm) was used instead of 10 g of $Al(OH)_3$ (average particle size: 1 μm) in Example 1.

Example 5

A spherical aluminum nitride powder was obtained in the same manner as in Example 1, except that 10 g of γ-$Al_2O_3$ (average particle size: 1 μm) was used instead of 10 g of $Al(OH)_3$ (average particle size: 1 μm) in Example 1.

Comparative Example 1

A spherical aluminum nitride powder was obtained in the same manner as in Example 1, except that 10 g of boehmite (average particle size: 1 μm) was used instead of 10 g of $Al(OH)_3$ (average particle size: 1 μm), and 0.3 g of $Cu_2O$ (average particle size: 1 μm) in Example 1 was not used.

Comparative Example 2

A spherical aluminum nitride powder was obtained in the same manner as in Example 1, except that 10 g of γ-$Al_2O_3$ (average particle size: 1 μm) was used instead of 10 g of $Al(OH)_3$ (average particle size: 1 μm), and 0.3 g of $Cu_2O$ (average particle size: 1 μm) in Example 1 was not used.

Comparative Example 3

A spherical aluminum nitride powder was obtained in the same manner as in Example 1, except that 0.3 g of $Y_2O_3$ (average particle size: 1 μm) was used instead of 0.3 g of $Cu_2O$ (average particle size: 1 μm) in Example 1.

Comparative Example 4

10 g of γ-$Al_2O_3$ (average particle size: 1 μm), 4 g of carbon black (specific surface area: 70 m²/g), and 0.3 g of $Y_2O_3$ (average particle size: 1 μm) were mixed.

The mixed powder was heat treated at 1700° C. for 10 hours under a $N_2$ atmosphere.

Then, the heat treated aluminum nitride compound was decarbonized at 700° C. for 10 hours in an air atmosphere to obtain an aluminum nitride powder.

Comparative Example 5

A spherical aluminum nitride powder was obtained in the same manner as in Comparative Example 4, except that 0.3 g of $Cu_2O$ (average particle size: 1 μm) was used instead of 0.3 g of $Y_2O_3$ (average particle size: 1 μm) in Comparative Example 4.

Experimental Example

AlN conversion, sphericity, and heat conductivity of the aluminum nitride powders produced in Examples 1 to 5 and Comparative Examples 1 to 5 were measured, and are shown in Table 1 below.

TABLE 1

| | AlN conversion (%) | Sphericity | Heat conductivity (W/mK) |
|---|---|---|---|
| Example 1 | 100 | 0.99 | 2.8 |
| Example 2 | 100 | 0.98 | 2.9 |
| Example 3 | 100 | 0.99 | 2.8 |
| Example 4 | 100 | 0.98 | 2.7 |
| Example 5 | 100 | 0.99 | 2.8 |
| Comparative Example 1 | 52 | 0.98 | 1.4 |
| Comparative Example 2 | 78 | 0.97 | 2.7 |
| Comparative Example 3 | 86 | 0.98 | 1.8 |
| Comparative Example 4 | 82 | 0.99 | — |
| Comparative Example 5 | 100 | 0.98 | — |

Referring to Table 1, it can be confirmed that when the aluminum nitride powder was produced according to the present invention as in Examples 1 to 5, AlN conversion is very high while having high sphericity and heat conductivity, whereas in Comparative Examples 1 to 4, the AlN conversion is very low. On the other hand, in Comparative Examples 4 and 5, since the carbon black existing in the AlN was removed in the decarbonization process, the heat conductivity could not be measured.

What is claimed is:

1. A method for producing a spherical aluminum nitride powder, comprising:
    (i) mixing an aluminum (Al) precursor and a flux in a solvent to produce a mixed solution;
    (ii) spray-drying the mixed solution produced in step (i) to form a spray-dried powder comprising the Al precursor and the flux;
    (iii) mixing the spray-dried powder and a carbon-based material to form a mixture;
    (iv) heat treating the mixture of step (iii) in a nitrogen atmosphere to form a heat-treated compound; and
    (v) decarbonizing the heat-treated compound of step (iv) in an air atmosphere to produce a spherical aluminum nitride powder,
    wherein the flux is at least one selected from the group consisting of $Cu_2O$, $TiO_2$, $Bi_2O_3$, and CuO, or a mixture of at least one selected from the group consisting of $Cu_2O$, $TiO_2$, $Bi_2O_3$, and CuO and at least one selected from the group consisting of $CaF_2$ and $Y_2O_3$.

2. The method for producing a spherical aluminum nitride powder according to claim 1, wherein the Al precursor is at least one selected from the group consisting of $Al(OH)_3$, boehmite (AlO(OH)), and $Al_2O_3$.

3. The method for producing a spherical aluminum nitride powder according to claim 1, wherein the solvent is water.

4. The method for producing a spherical aluminum nitride powder according to claim 1, wherein the mixed solution of step (i) further includes at least one selected from the group consisting a binder and a dispersing agent.

5. The method for producing a spherical aluminum nitride powder according to claim 1, wherein the flux is present in the mixed solution of step (i) in an amount of 0.1 to 10% by weight based on the weight of the Al precursor.

6. The method for producing a spherical aluminum nitride powder according to claim 1, wherein the carbon-based material is a carbon black.

7. The method for producing a spherical aluminum nitride powder according to claim 1, wherein the carbon-based material is present in the mixture of step (iii) in an amount of 30 to 70% by weight based on the weight of the Al precursor.

8. The method for producing a spherical aluminum nitride powder according to claim 1, wherein step (iv) further comprises:
    heat treating the mixture of step (iii) in the nitrogen atmosphere at a temperature ranging from 1200° C. to 1900° C. for 1 to 10 hours.

9. The method for producing a spherical aluminum nitride powder according to claim 1, wherein step (v) further comprises:
    decarbonizing the heat-treated compound of step (iv) in an air atmosphere at a temperature ranging from 600° C. to 800° C. for 1 to 3 hours.

10. The method for producing a spherical aluminum nitride powder according to claim 1, wherein the spherical aluminum nitride powder has an average particle size of 5 to 200 microns.

* * * * *